(12) United States Patent
Endo et al.

(10) Patent No.: US 8,269,387 B2
(45) Date of Patent: Sep. 18, 2012

(54) COIL FOR ROTATING ELECTRIC MACHINE HAVING BENT DRAWN-OUT ENDS

(75) Inventors: Yasuhiro Endo, Okazaki (JP); Eiji Yamada, Owariasahi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 234 days.

(21) Appl. No.: 12/738,544

(22) PCT Filed: Oct. 16, 2008

(86) PCT No.: PCT/JP2008/068710
§ 371 (c)(1),
(2), (4) Date: Apr. 16, 2010

(87) PCT Pub. No.: WO2009/051161
PCT Pub. Date: Apr. 23, 2009

(65) Prior Publication Data
US 2010/0207466 A1   Aug. 19, 2010

(30) Foreign Application Priority Data
Oct. 19, 2007  (JP) .................................. 2007-272962

(51) Int. Cl.
*H02K 11/00* (2006.01)
*H02K 3/00* (2006.01)
(52) U.S. Cl. .......... 310/71; 310/200; 310/214; 310/194; 310/216.005; 310/201; 310/202; 310/203; 310/216.008
(58) Field of Classification Search .................... 310/71, 310/200–208, 214, 194, 216.005, 216.008, 310/216.029, 216.061; *H02K 11/00, 3/00*
See application file for complete search history.

(56) References Cited

U.S. PATENT DOCUMENTS

| | | | |
|---|---|---|---|
| 4,959,470 A * | 9/1990 | Treuner ......................... 540/363 |
| 6,411,006 B2 * | 6/2002 | Suzuki et al. ............... 310/261.1 |
| 6,703,749 B2 | 3/2004 | Kuroyanagi |
| 6,822,356 B2 * | 11/2004 | Suzuki et al. .................... 310/71 |
| 7,268,456 B2 * | 9/2007 | Harada et al. ................. 310/201 |
| 7,928,619 B2 * | 4/2011 | Watanabe et al. ............... 310/71 |
| 2004/0000830 A1 | 1/2004 | Gomyo et al. |
| 2004/0201303 A1 * | 10/2004 | Zhang et al. .................. 310/216 |

(Continued)

FOREIGN PATENT DOCUMENTS

CN  1455491 A  11/2003

(Continued)

OTHER PUBLICATIONS

Machine translation of JP2004080860, Oyama et al., Nov. 2004.*

(Continued)

*Primary Examiner* — Quyen Leung
*Assistant Examiner* — Terrance Kenerly
(74) *Attorney, Agent, or Firm* — Sughrue Mion, PLLC

(57) ABSTRACT

A rotating electric machine includes an annular stator including a coil formed by winding a part of a coil wire around a stator core, and the coil wire includes the coil wound around stator teeth, a terminal portion drawn out from one end portion of the coil over a yoke portion, and a wiring drawn out from the other end portion of the coil over the yoke portion and connected to a terminal portion of another coil wire including another coil provided at a distance from the coil in a circumferential direction of the stator.

5 Claims, 12 Drawing Sheets

U.S. PATENT DOCUMENTS

| | | | |
|---|---|---|---|
| 2004/0256941 A1* | 12/2004 | Yoneda et al. | 310/179 |
| 2005/0146232 A1* | 7/2005 | Yamamoto et al. | 310/43 |
| 2006/0170298 A1* | 8/2006 | Edrington | 310/90 |
| 2008/0143203 A1* | 6/2008 | Purvines et al. | 310/71 |
| 2009/0096313 A1* | 4/2009 | Harada et al. | 310/201 |

FOREIGN PATENT DOCUMENTS

| | | |
|---|---|---|
| DE | 4126019 A1 | 2/1992 |
| JP | 11018331 A | 1/1999 |
| JP | 2002-199644 A | 7/2002 |
| JP | 2003-324886 A | 11/2003 |
| JP | 2004080860 A | 3/2004 |
| JP | 2004-159427 A | 6/2004 |
| JP | 2005-137057 A | 5/2005 |
| JP | 2005-287240 A | 10/2005 |
| JP | 2005-310566 A | 11/2005 |
| JP | 2005-318669 A | 11/2005 |
| JP | 2005318669 A | 11/2005 |
| JP | 2006-238641 A | 9/2006 |
| JP | 2006238641 A | 9/2006 |

OTHER PUBLICATIONS

Chinese Office Action issued in Application No. 200880112189.6, dated Nov. 16, 2011.

German Office Action issued in Application No. 11 2008 002 806.0, dated Nov. 2, 2011.

* cited by examiner

COIL FOR ROTATING ELECTRIC MACHINE HAVING BENT DRAWN-OUT ENDS

CROSS REFERENCE TO RELATED APPLICATION

This application is a National Stage of International Application No. PCT/JP2008/068710 filed Oct. 16, 2008, claiming priority based on Japanese Patent Application No. 2007-272962, filed Oct. 19, 2007, the contents of all of which are incorporated herein by reference in their entirety.

TECHNICAL FIELD

The present invention relates to a rotating electric machine, and particularly to a rotating electric machine including a plurality of divided stator cores, that achieves reduction in the number of parts and a smaller size.

BACKGROUND ART

Various types of rotating electric machines have conventionally been proposed in order to facilitate attachment of a winding. For example, a brushless motor described in Japanese Patent Laying-Open No. 2004-159427 includes radially extending teeth and a can coupling radially inward end portions of the teeth to one another and having a bottom portion closing one end formed, in which a winding is wound around each tooth. In attaching each winding to the teeth, a winding wound in advance to form a plurality of coils is attached to the teeth, so that the coils are simultaneously attached to the teeth. A crossing wire extending from a prescribed tooth to another tooth is disposed along the bottom portion of the can.

Thus, as compared with an example where each winding wound around each tooth is connected by using a connection member such as a bus bar, the number of parts can be decreased and connection can be facilitated.

In addition, a three-phase motor described in Japanese Patent Laying-Open No. 2002-199644 includes a stator including a coil assembly constituted of three-phase coils. A neutral point of each coil is connected to a bus bar formed of a conductive material and this bus bar is arranged on an outer side of the coil assembly. By thus arranging the bus bar around an outer circumference of the coil assembly, a bundle of connection lines of the neutral points and the neutral points are not adjacent to each other in a direction of axis of the coil assembly and reduction in an axial length of the motor is achieved.

Patent Document 1: Japanese Patent Laying-Open No. 2004-159427
Patent Document 2: Japanese Patent Laying-Open No. 2002-199644

DISCLOSURE OF THE INVENTION

Problems to be Solved by the Invention

In the brushless motor described in Japanese Patent Laying-Open No. 2004-159427, however, the can is an essential component and the number of parts cannot be reduced. In addition, as the crossing wire is disposed in the bottom portion of the can, reduction in the axial length is not sufficient.

In the three-phase motor described in Japanese Patent Laying-Open No. 2002-199644, distributed winding is adopted for the coil. In general, in distributed winding, a space factor of the coil is low and a length of one coil is long, which leads to great copper loss.

In order to provide means for solving such a problem, for example, a method of implementing a stator by forming a stator core with a plurality of divided stator cores is possible, a coil being wound around each divided stator core and the divided stator cores having the coils wound being annularly arranged. According to this method, as the coil is wound around each divided stator core, the space factor of the coil can be improved and a length of the coil can be reduced, so that copper loss can be reduced.

In the rotating electric machine including such a plurality of divided stator cores, however, coils attached to respective divided stator cores should be connected to each other. For example, a method of connecting the coils to each other through an annular power distribution member by arranging the annular power distribution member at a position adjacent to the stator in a direction of a central axis of the stator is possible as a method of connecting the coils.

Arrangement of such a power distribution member, however, leads to a longer length of the rotating electric machine in the direction of the central axis and the number of parts is further increased.

The present invention was made in view of the above-described problems, and an object of the present invention is to provide a rotating electric machine including a plurality of divided stator cores, that achieves reduction in the number of parts and a shorter length of the rotating electric machine in a direction of a central axis.

Means for Solving the Problems

A rotating electric machine according to the present invention includes a rotatably provided rotor and an annular stator including an annularly formed stator core arranged around the rotor and a winding portion formed by winding a part of a coil wire around the stator core.

The stator core above includes a plurality of divided stator cores aligned in a circumferential direction of the stator, and the divided stator core includes a yoke portion extending in the circumferential direction of the stator and stator teeth projecting from the yoke portion toward the rotor, to which the winding portion is attached. The coil wire above includes the winding portion wound around the stator teeth, a drawn-out portion drawn out from one end portion of the winding portion over the yoke portion, and a wiring portion drawn out from the other end portion of the winding portion to extend over the yoke portion and connected to a drawn-out portion of another coil wire including another winding portion provided at a distance from the winding portion in the circumferential direction of the stator.

Preferably, the wiring portion above is drawn out from an end portion of the winding portion on a radially outward side of the stator over the yoke portion, and the drawn-out portion is drawn out from an end portion of the winding portion on a radially inward side of the stator over the yoke portion.

Preferably, the rotating electric machine further includes an insulating member attached to the stator teeth above, for insulating the coil wire and the stator teeth from each other. The insulating member above includes a stator teeth reception portion having a through hole capable of receiving the stator teeth formed and a projection portion formed to project from the stator teeth reception portion and extending along an inner circumferential surface of the yoke portion. The projection portion above has a guide portion formed, for guiding the wiring portion from the winding portion to the yoke portion.

Preferably, the insulating member above includes a yoke insulating portion for insulating the wiring portion and the drawn-out portion from the yoke portion. Preferably, the coil wire above has a cross-section in a square shape perpendicular to a direction of extension of the coil wire, and the winding portion is structured by winding and layering the coil wire from a base portion of the stator teeth located on a side of the yoke portion toward a tip end portion thereof located radially inward of the stator. Preferably, the coil wire above includes a first coil wire supplied with AC power of a first phase and a second coil wire connected to the first coil wire and a third coil wire supplied with AC power of a second phase and a fourth coil wire connected to the third coil wire.

A third winding portion of the third coil wire above is provided at a position adjacent to a first winding portion of the first coil wire in the circumferential direction of the stator, and a second winding portion of the second coil wire is arranged opposite to the first winding portion, with respect to the third winding portion of the third coil wire. In addition, a fourth winding portion of the fourth coil wire above is arranged opposite to the third winding portion, with respect to the second winding portion, and a first wiring portion of the first coil wire is connected to a second drawn-out portion of the second coil wire through an outer circumferential side of the third winding portion. A third wiring portion of the third coil wire above is connected to a fourth drawn-out portion of the fourth coil wire through an outer circumferential side of the second winding portion, and a third drawn-out portion of the third coil wire extends radially outward of the stator between the first wiring portion and the yoke portion and bends in a direction of a central axis of the stator for receiving the first wiring portion on a side radially outward of the stator relative to the first wiring portion. The second drawn-out portion of the second coil wire above extends radially outward of the stator between the third wiring portion and the yoke portion and bends toward the direction of the central axis of the stator for receiving the third wiring portion on a side radially outward of the stator relative to the third wiring portion.

Effects of the Invention

According to the rotating electric machine of the present invention, the number of parts of the rotating electric machine can be decreased and a length in a direction of a central axis of the rotating electric machine can be shortened.

DESCRIPTION OF THE REFERENCE SIGNS 100 rotating electric machine; 110 rotation shaft; 120 rotor; 121 rotor core; 122 permanent magnet; 124 resin; 126 magnet insertion hole; 130 stator; 131U U-phase coil; 131V V-phase coil; 131W W-phase coil; 134U U-phase wiring; 134V V-phase wiring; 134W W-phase wiring; 135U U-phase terminal portion; 135V V-phase terminal portion; 135W W-phase terminal portion; 136U U-phase external terminal portion; 136V V-phase external terminal portion; 136W W-phase external terminal portion; 140 neutral point; 150 divided stator core; 151 stator teeth; 152 yoke portion; 160 insulator; 161 teeth reception portion; 162 projection portion; 163 yoke insulating portion; and 164 yoke insulating portion.

BEST MODES FOR CARRYING OUT THE INVENTION

A rotating electric machine according to an embodiment of the present invention will be described with reference to FIGS. 1 to 14. When the number, an amount or the like is mentioned in the embodiment described below, the scope of the present invention is not necessarily limited to such a number, an amount or the like, unless otherwise specified. In addition, in the embodiment below, each component is not necessarily essential in the present invention, unless otherwise specified. Moreover, when a plurality of embodiments are shown below, combination as appropriate of features in the embodiments is originally encompassed, unless otherwise specified.

Figure 1:
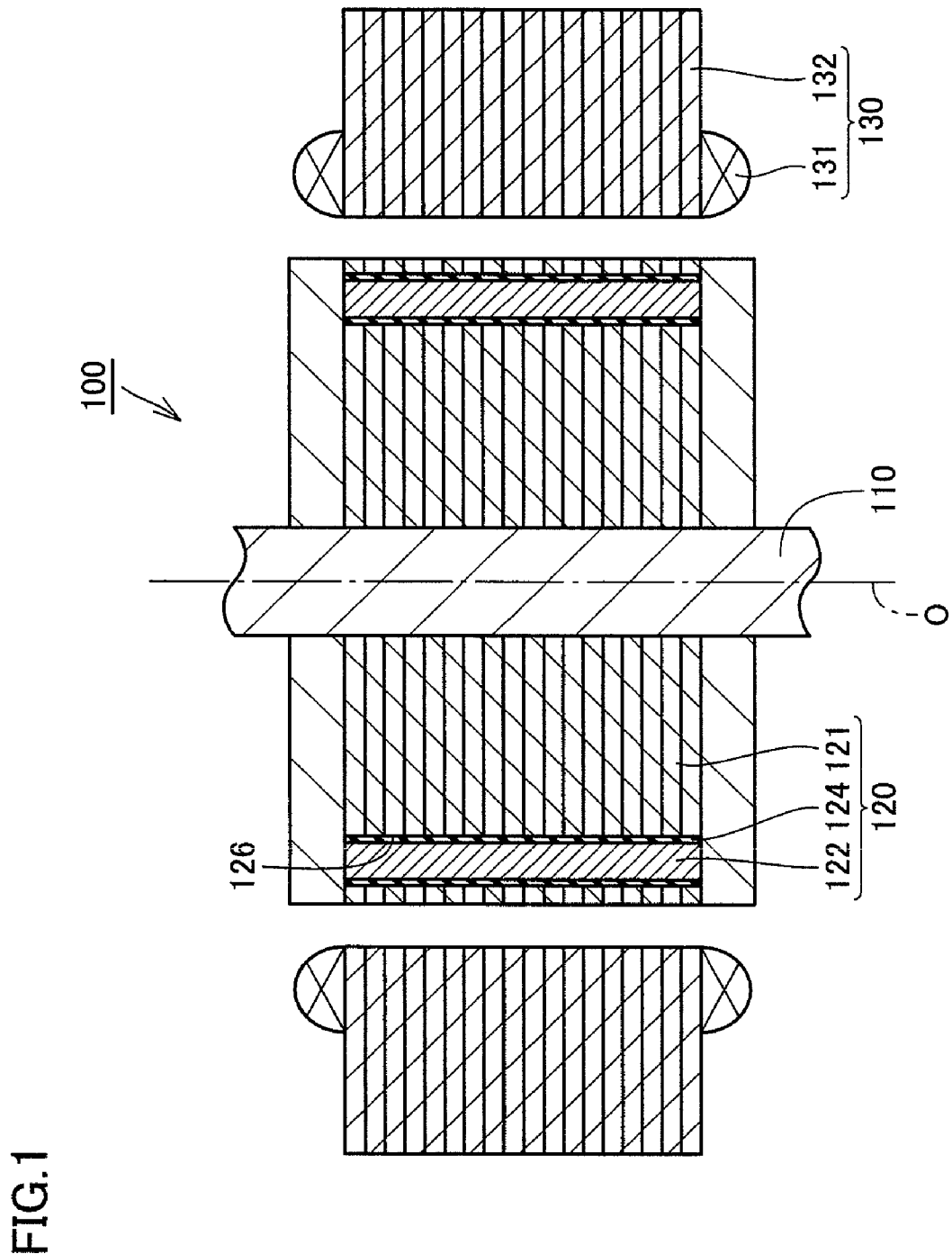
FIG. 1 is a cross-sectional view of a rotating electric machine according to an embodiment of the present invention.

FIG. 1 is a cross-sectional view of a rotating electric machine 100 according to an embodiment of the present invention. As shown in FIG. 1, rotating electric machine 100 includes a rotation shaft 110 rotatably supported around a rotation centerline O, a rotor 120 securely provided on rotation shaft 110, and a stator 130 annularly arranged around rotor 120.

Rotor 120 includes a rotor core 121 formed in a cylindrical shape and a permanent magnet 122 inserted in a magnet insertion hole 126 formed in rotor core 121 and extending in a direction of rotation centerline O. Rotor core 121 is formed, for example, by layering a plurality of electromagnetic steel sheets, or formed with a dust core or the like. Permanent magnet 122 is fixed in magnet insertion hole 126 by using resin 124 with which magnet insertion hole 126 is filled.

Figure 2:
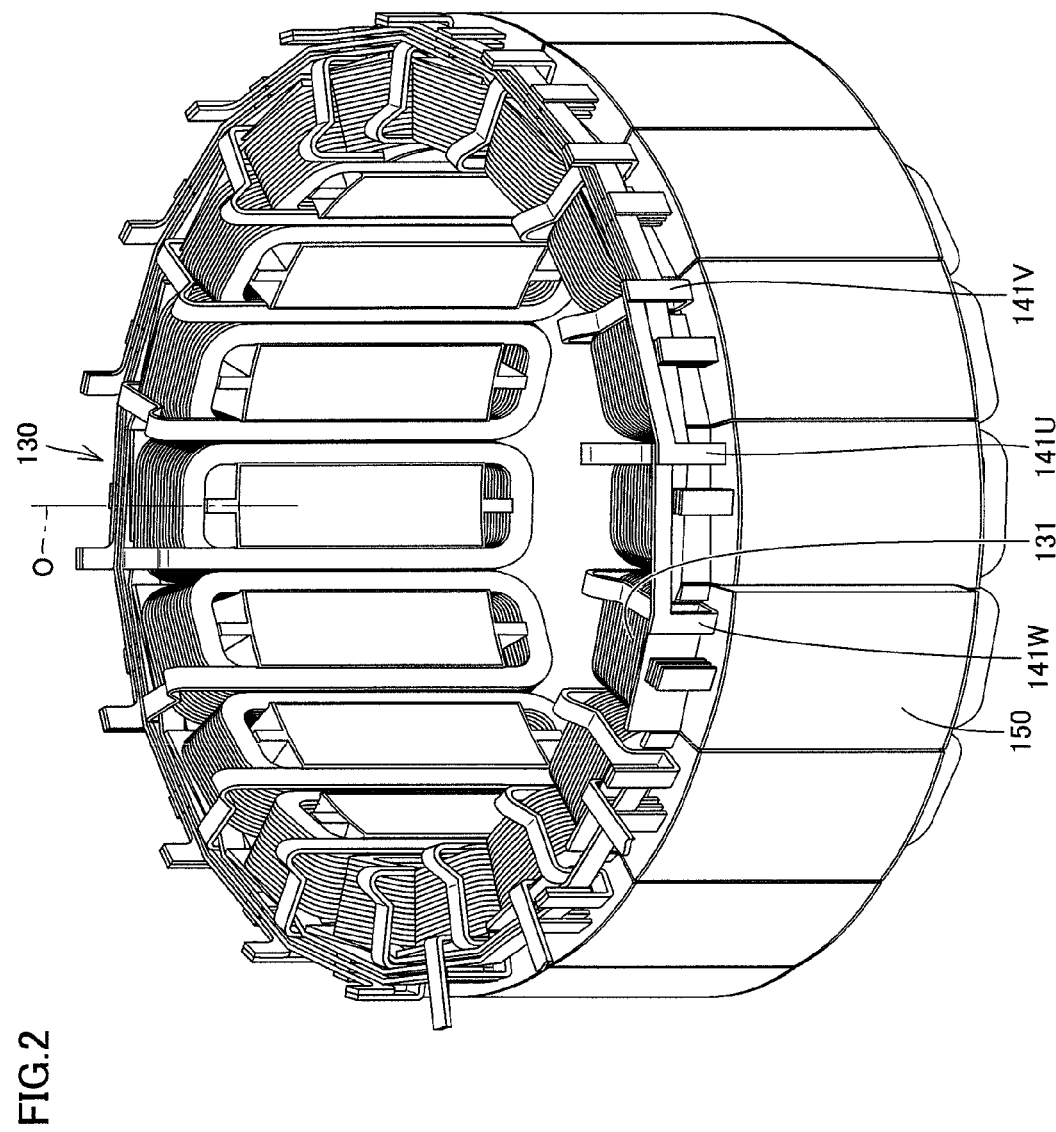
FIG. 2 is a perspective view of a stator.

FIG. 2 is a perspective view of stator 130. As shown in FIG. 2, stator 130 includes a plurality of divided stator cores 150 annularly arranged around rotation centerline O and a coil 131 wound around divided stator core 150.

Figure 3:
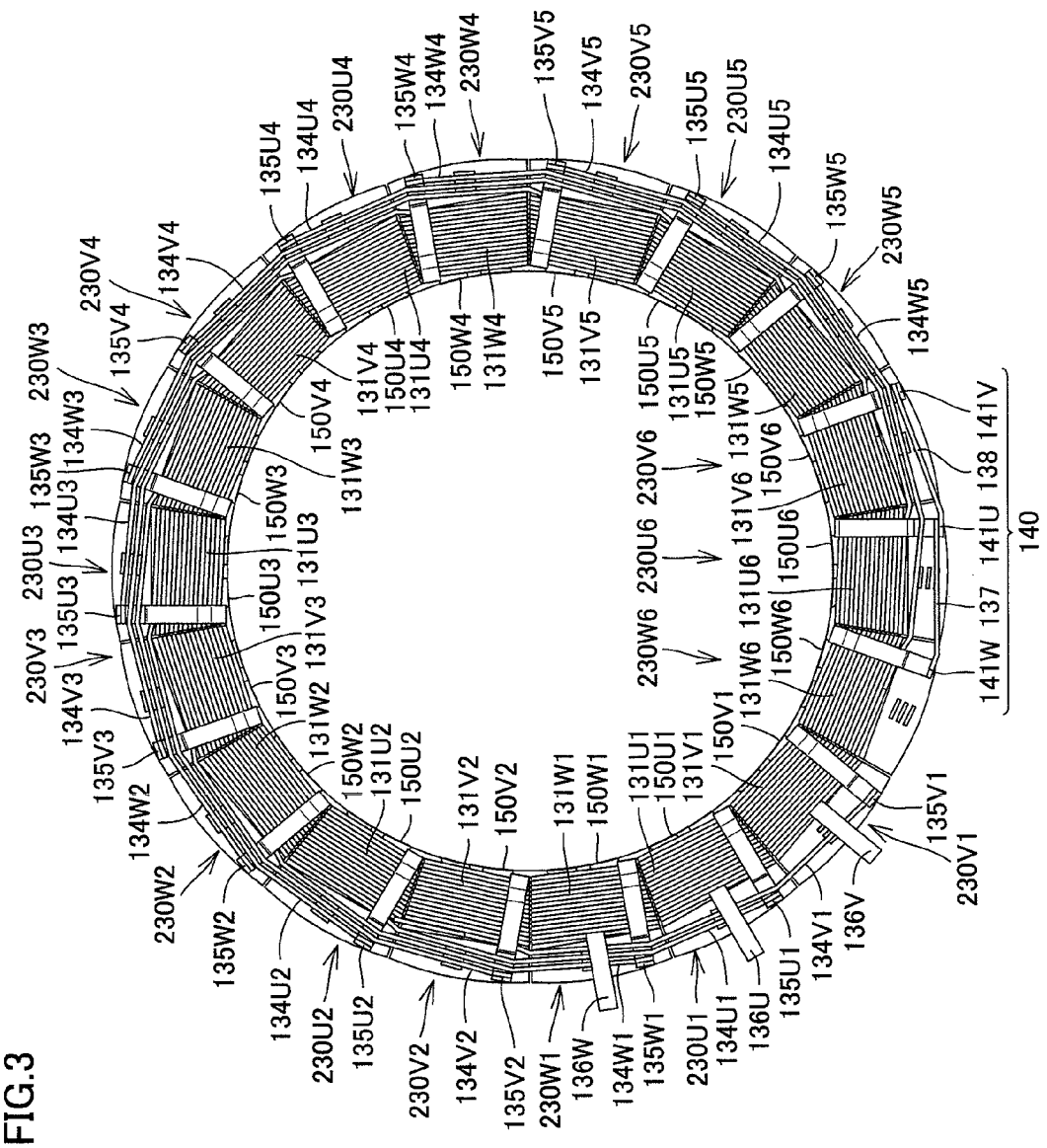
FIG. 3 is a plan view of the stator showing a state of connection of each coil.
Figure 4:
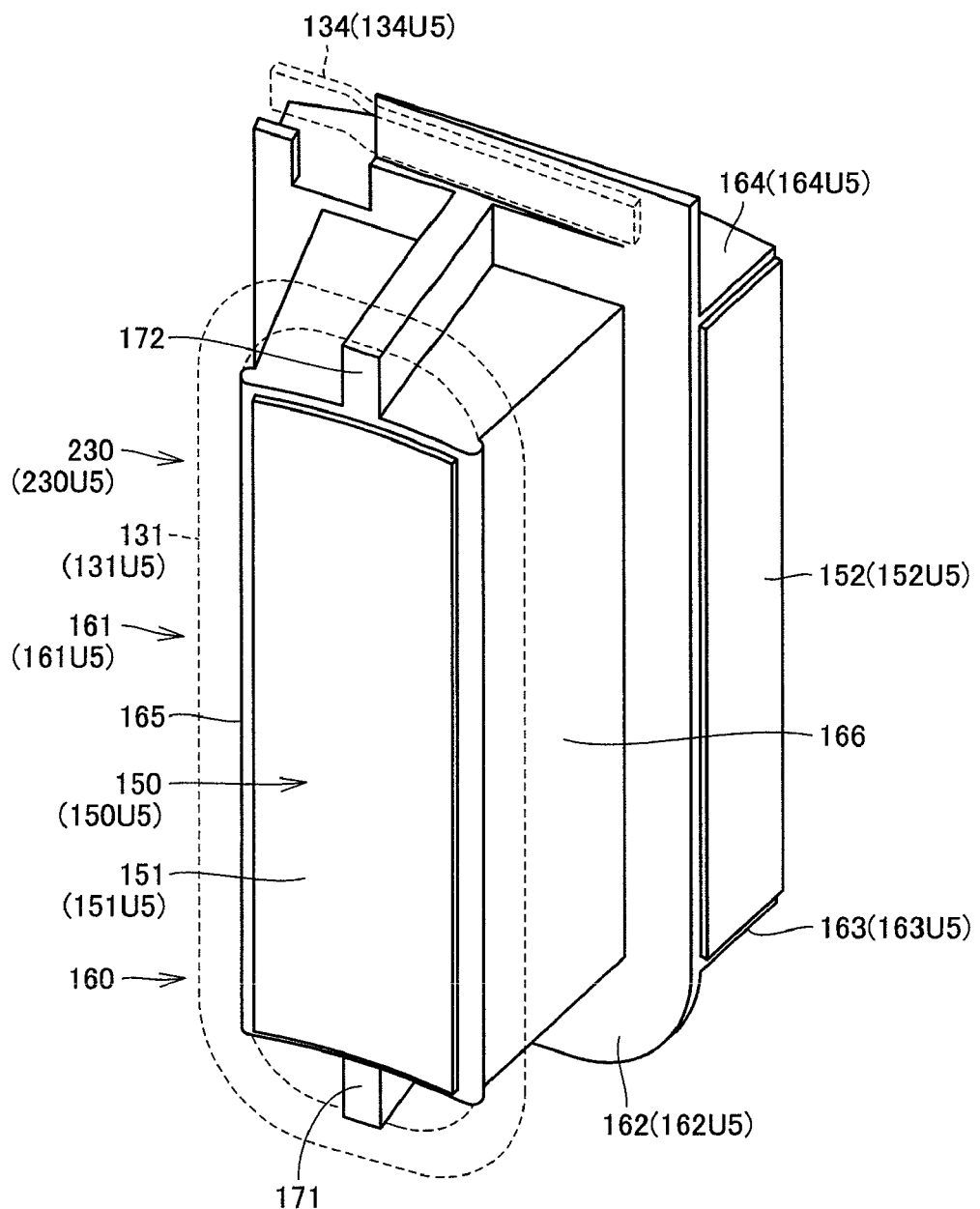
FIG. 4 is a perspective view of each divided stator core.

FIG. 3 is a plan view of stator 130, showing a state of connection of each coil 131. FIG. 4 is a perspective view of each divided stator core 150. In FIGS. 3 and 4, rotating electric machine 100 is supplied with power from a battery through not-shown inverter and converter. DC power from the battery is converted to three-phase AC power by the inverter and the converter for supply to rotating electric machine 100.

Each divided stator core 150 includes a yoke portion 152 extending along a circumferential direction of stator 130 and stator teeth 151 projecting from yoke portion 152 toward rotor 120 shown in FIG. 1.

Rotating electric machine 100 shown in FIG. 3 includes a U-phase external terminal portion 136U supplied with U-phase AC power, a V-phase external terminal portion 136V supplied with V-phase AC power, and a W-phase external terminal portion 136W supplied with W-phase AC power.

A plurality of divided stator cores 150V1, 150U1, 150W1 to 150V6, 150U6, 150W6 are aligned in the circumferential direction of stator 130. Coils 130V1, 130U1, 130W1 to 130V6, 130U6, 130W6 formed by winding a part of coil wires 230V1, 230U1, 230W1 to 230V6, 230U6, 230W6 are attached to divided stator cores 150V1, 150U1, 150W1 to 150V6, 150U6, 150W6, respectively. Coil wires 230V1, 230U1, 230W1 to 230V6, 230U6, 230W6 include coils 130V1, 130U1, 130W1 to 130V6, 130U6, 130W6 above, terminal portions 135V1, 135U1, 135W1 to 135V5, 135U5, 135W5 connected to inner end portions of these coils 130V1, 130U1, 130W1 to 130V6, 130U6, 130W6, and wirings 134V1, 134U1, 134W1 to 134U5, 134W5 connected to outer end portions of coils 130V1, 130U1, 130W1 to 130V6, 130U6, 130W, respectively.

V-phase wiring 134V1 of coil wire 230V2 is connected to V-phase terminal portion 135V1 of coil wire 230V1, so that V-phase coil 131V1 and V-phase coil 131V2 are connected with each other. V-phase wiring 134V2 of coil wire 230V3 is connected to V-phase terminal portion 135V2 of coil wire 230V2 so that V-phase coil 131V2 and V-phase coil 131V3 are electrically connected with each other. V-phase wiring 134V3 of coil wire 230V4 is connected to V-phase terminal portion 135V3 of coil wire 230V3 so that V-phase coil 131V3 and V-phase coil 131V4 are electrically connected with each other. V-phase wiring 134V4 of coil wire 230V5 is connected to V-phase terminal portion 135V4 of coil wire 230V4 so that V-phase coil 131V4 and V-phase coil 131V5 are electrically connected with each other. V-phase wiring 134V5 of coil wire 230V6 is connected to V-phase terminal portion 135V5 of coil wire 230V5 so that V-phase coil 131V5 and V-phase coil 131V6 are electrically connected with each other.

U-phase wiring 134U1 of coil wire 230U2 is connected to U-phase terminal portion 135U1 of coil wire 230U1 so that U-phase coil 131U1 and U-phase coil 131U2 are connected with each other. U-phase wiring 134U2 of coil wire 230U3 is connected to U-phase terminal portion 135U2 of coil wire 230U2 so that U-phase coil 131U2 and U-phase coil 131U3 are electrically connected with each other. U-phase wiring 134U3 of coil wire 230U4 is connected to U-phase terminal portion 135U3 of coil wire 230U3 so that U-phase coil 131U3 and U-phase coil 131U4 are electrically connected with each other. U-phase wiring 134U4 of coil wire 230U5 is connected to U-phase terminal portion 135U4 of coil wire 230U4 so that U-phase coil 131U4 and U-phase coil 131U5 are electrically connected with each other. U-phase wiring 134U5 of coil wire 230U6 is connected to U-phase terminal portion 135U5 of coil wire 230U5 so that U-phase coil 131U5 and U-phase coil 131U6 are electrically connected with each other.

W-phase wiring 134W1 of coil wire 230W2 is connected to W-phase terminal portion 135W1 of coil wire 230W1 so that W-phase coil 131W1 and W-phase coil 131W2 are connected with each other. W-phase wiring 134W2 of coil wire 230W3 is connected to W-phase terminal portion 135W2 of coil wire 230W2 so that W-phase coil 131W2 and W-phase coil 131W3 are electrically connected with each other. W-phase wiring 134W3 of coil wire 230W4 is connected to W-phase terminal portion 135W3 of coil wire 230W3 so that W-phase coil 131W3 and W-phase coil 131W4 are electrically connected with each other. W-phase wiring 134W4 of coil wire 230W5 is connected to W-phase terminal portion 135W4 of coil wire 230W4 so that W-phase coil 131W4 and W-phase coil 131W5 are electrically connected with each other. W-phase wiring 134W5 of coil wire 230W6 is connected to W-phase terminal portion 135W5 of coil wire 230W5 so that W-phase coil 131W5 and W-phase coil 131W6 are electrically connected with each other.

Thus, V-phase coils 131V1 to 131V6 are electrically connected with one another, U-phase coils 131U1 to 131U6 are electrically connected with one another, and W-phase coils 131W1 to 131W6 are electrically connected with one another.

Here, coil wire 230V6 includes a neutral point terminal portion 141V, coil wire 230U6 includes a neutral point terminal portion 141U, and neutral point terminal portion 141V and neutral point terminal portion 141U are connected to each other through a neutral point connection wiring 138. In addition, coil wire 230W6 includes a neutral point terminal portion 141W, and neutral point terminal portion 141W and neutral point terminal portion 141U are connected to each other through a neutral point connection wiring 137. These neutral point terminal portions 141V, 141U, 141V as well as neutral point connection wiring 137 and neutral point connection wiring 138 constitute a neutral point 140.

Here, V-phase coils 131V1 to 131V6 are adjacent to U-phase coils 131U1 to 131U6 in the circumferential direction of stator 130, respectively. In addition, W-phase coils 131W1 to 131W6 are arranged opposite to V-phase coils 131V1 to 131V6, with respect to U-phase coils 131U1 to 131U6, respectively.

W-phase wiring 134W5 drawn out from W-phase coil 131W6 extends over the yoke portion of divided stator cores 150U6, 150V6, 150W5 located radially outward of U-phase coil 131U6, V-phase coil 131V6 and W-phase coil 131W5. From a position of draw-out from W-phase coil 131W6 toward W-phase terminal portion 135W5, W-phase wiring 134W5 is displaced radially outward of stator 130 and connected to W-phase terminal portion 135W5.

U-phase wiring 134U5 drawn out from U-phase coil 131U6 adjacent to W-phase coil 131W6 in a direction of extension of W-phase wiring 134W5 extends over the yoke portion of divided stator cores 150V6, 150W5, 150U5 located radially outward of V-phase coil 131V6, W-phase coil 131W5 and U-phase coil 131U5.

U-phase wiring 134U5 passes on a radially inward side of W-phase wiring 134W5, on the radially outward side of V-phase coil 131V6 and W-phase coil 131W5, and U-phase wiring 134U5 is displaced radially outward as it approaches U-phase terminal portion 135U5 and connected to U-phase terminal portion 135U5.

In addition, V-phase wiring 134V5 drawn out from V-phase coil 131V6 adjacent to U-phase coil 131U6 in a direction of extension of U-phase wiring 134U5 extends over the yoke portion of divided stator cores 150W5, 150U5, 150V5 located radially outward of W-phase coil 131W5, U-phase coil 131U5, and V-phase coil 131V5.

V-phase wiring 134V5 passes on a radially inward side of W-phase wiring 134W5 and U-phase wiring 134U5, on the radially outward side of W-phase coil 131W5, and it passes on a radially inward side of U-phase wiring 134U5, on the radially outward side of U-phase coil 131U5.

V-phase wiring 134V5 is also displaced radially outward as it approaches from the drawn-out portion from V-phase coil 131V6 toward V-phase terminal portion 135V5 and connected to V-phase terminal portion 135V5. In addition, W-phase wiring 134W4 drawn out from W-phase coil 131W5 adjacent to V-phase coil 131V6 in a direction of extension of V-phase wiring 134V5 extends over the yoke portion of divided stator cores 150U5, 150V5, 150W4 located radially outward of U-phase coil 131U5, V-phase coil 131V5 and W-phase coil 131W4. W-phase wiring 134W4 passes on the radially inward side of U-phase wiring 134U5 and V-phase wiring 134V5, on the radially outward side of U-phase coil 131U5, and it further passes on the radially inward side of V-phase wiring 134V5, on the radially outward side of V-phase coil 131V5. W-phase wiring 134W4 is also displaced radially outward as it approaches from the position of draw-out from W-phase coil 131W5 toward W-phase terminal portion 135W4 and connected to W-phase wiring 134W4. Other wirings are also disposed as in the case of W-phase wiring 134W5, U-phase wiring 134U5, V-phase wiring 134V5, and W-phase wiring 134W4 above.

Thus, coils 130V1, 130U1, 130W1 to 130V6, 130U6, 130W6 provided at a distance from each other in the circumferential direction are connected to each other through wirings 134V1, 134U1, 134W1 to 134V5, 134U5, 134W5 of coil wires 230V2, 230U2, 230W2 to 230V6, 230U6, 230W6, respectively. Namely, a connection wiring or the like for connecting coils as in the conventional rotating electric machine is not necessary and the number of parts in rotating electric machine 100 can be decreased.

In addition, wirings 134V1, 134U1, 134W1 to 134V5, 134U5, 134W5 are disposed such that they are displaced from one another in the radial direction of stator 130 and they are not layered in the direction of rotation centerline O. Therefore, the height in the direction of rotation centerline O of rotating electric machine 100 can be suppressed to be low.

Figure 5:
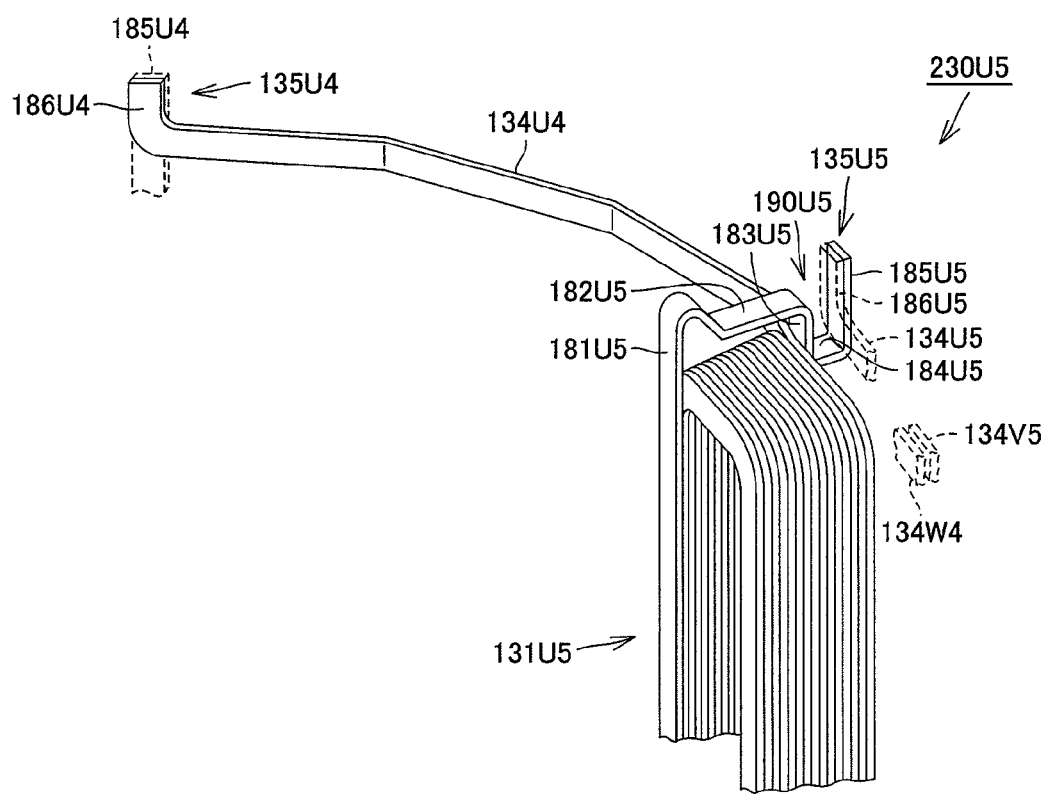
FIG. 5 is a perspective view showing details of a coil wire.

FIG. 5 is a perspective view showing details of coil wire 230U5. As shown in FIG. 5, coil wire 230U5 includes U-phase coil 131U5 wound around stator teeth 151U5 of divided stator core 150U5 shown in FIG. 4, U-phase terminal portion 135U5 drawn out from the radially inward end portion of U-phase coil 131U5 over yoke portion 152U5 of divided stator core 150U5, and U-phase wiring 134U4 drawn out from the radially outward end portion of U-phase coil 131U5.

U-phase terminal portion 135U5 includes a radially extending portion 182U5 drawn out from an inner circumferential end portion 181U5 which is the radially inward end portion of U-phase coil 131U5 and extending radially outward of stator 130 from inner circumferential end portion 181U5, a downwardly extending portion 183U5 extending downward from radially extending portion 182U5 toward an end surface of yoke portion 152, a bottom portion 184U5 extending radially outward of stator 130 from a lower end portion of downwardly extending portion 183U5, and a rising portion 185U5 rising in the direction of rotation centerline O from the end portion of bottom portion 184U5.

Inner circumferential end portion 181U5 extends toward the direction of rotation centerline O and U-phase terminal portion 135U5 is structured by bending a portion of coil wire 230U5 on the end portion side relative to inner circumferential end portion 181U5. By thus structuring U-phase terminal portion 135U by bending the portion located on the end portion side relative to inner circumferential end portion 181U5 extending in the direction of rotation centerline O, the number of times of bending in forming U-phase terminal portion 135U5 can be decreased.

A reception portion 190U5 capable of receiving V-phase wiring 134V5 and W-phase wiring 134W4 is defined by downwardly extending portion 183U5, bottom portion 184U5 and rising portion 185U5 of U-phase terminal portion 135U5. Reception portion 190U5 is formed to open upward, and bottom portion 184U5 extends in the radial direction of stator 130 between V-phase wiring 134V5, W-phase wiring 134W4 and yoke portion 152U5 of divided stator core 150U5.

U-phase wiring 134U4 is formed such that it is drawn out from the radially outward end portion of U-phase coil 131U5 formed by winding a part of coil wire 230U5 around stator teeth 151U5 over yoke portion 152U5. U-phase wiring 134U4 is drawn out from the end portion located radially outward of U-phase coil 131U5 and extending in the radial direction of stator 130. Thus, the number of times of bending the end portion side of coil wire 230U5 for forming U-phase wiring 134U4 is decreased. Namely, the number of times of bending coil wire 230U5 can be decreased by forming U-phase terminal portion 135U5 by drawing it out from inner circumferential end portion 181U5 and by forming U-phase wiring 134U4 by drawing it out from the outer circumferential end portion of U-phase coil 131U5, so that coil wire 230U5 can readily be structured.

On the tip end portion side of U-phase wiring 134U4, a connection portion 186U4 bent in the direction of rotation centerline O and connected to U-phase terminal portion 135U4 of coil wire 230U4 adjacent in the circumferential direction is formed.

Here, an insulating coating formed on a surface of coil wire 230U5 and coil wire 230U4 is removed from a portion of the surface of rising portion 185U4 in contact with connection portion 186U4 and a portion of the surface of connection portion 186U4 in contact with rising portion 185U4, so that these portions are electrically connected with each other. It is noted that connection portion 186U4 is in contact with the inner surface on the radially inward side of rising portion 185U4. Rising portion 185U4 and connection portion 186U4 may be bonded to each other, for example, by soldering.

Similarly, a connection portion 186U5 of U-phase wiring 134U5 drawn out from U-phase coil 131U6 located opposite to the direction of extension of U-phase wiring 134U4 with respect to U-phase coil 131U5 is also connected to rising portion 185U5.

Coil wire 230U5 has a cross-section in a square shape perpendicular to a direction of extension of coil wire 230U5. U-phase coil 131U5 is structured by winding and layering the coil wire from a base portion of stator teeth 151U5 shown in FIG. 4 located on yoke portion 152U5 side toward a tip end portion of stator teeth 151U5 located radially inward of stator 130. Thus, as compared with a coil wire having a cross-section in a circular shape, the space factor can be improved.

The structure of coil wire 230U5 has been described with reference to FIG. 5, however, other coil wires 230V1, 230U1, 230W1, 230V2, 230U2, 230W2, 230V3, 230U3, 230W3, 230V4, 230U4, 230W4, 230V5, 230W5 are also similarly structured.

Figure 6:
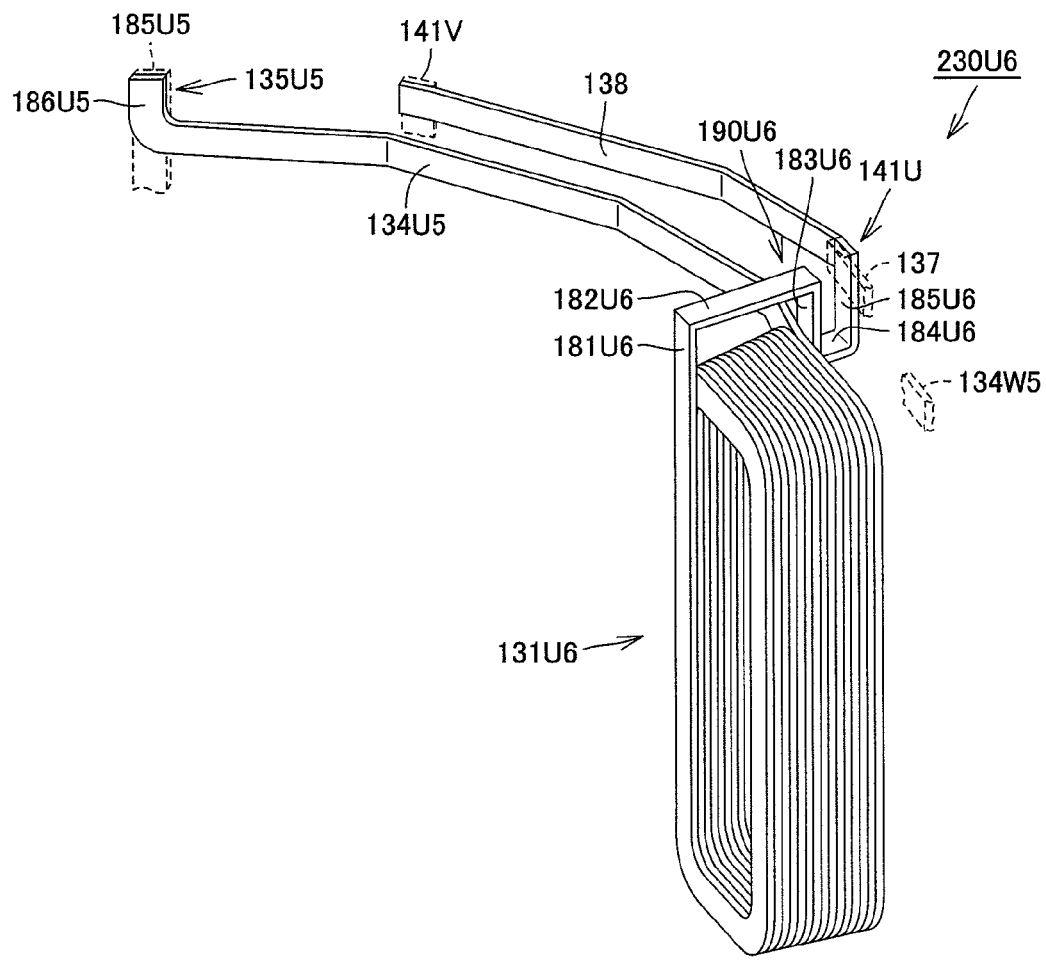
FIG. 6 is a perspective view showing details of a coil wire.

FIG. 6 is a perspective view showing details of coil wire 230U6. As shown in FIG. 6, coil wire 230U6 includes U-phase coil 131U6 attached to stator teeth 151 of divided stator core 150, neutral point terminal portion 141U drawn out from an inner circumferential end portion 181U6 of U-phase coil 131U6, neutral point connection wiring 138 extending in the circumferential direction from the end portion of neutral point terminal portion 141U, and U-phase wiring 134U5 drawn out from the outer circumferential end portion of U-phase coil 131U6.

Neutral point connection wiring 137 of coil wire 230W6 is connected to neutral point terminal portion 141U, and neutral point connection wiring 138 is further connected to a circumferentially inward side surface of neutral point terminal portion 141V. Connection portion 186U5 bent in the direction of rotation centerline O is formed at the tip end portion of U-phase wiring 134U5, and connection portion 186U5 is connected to a radially inward side surface of rising portion 185U5.

Neutral point terminal portion 141U includes a radially extending portion 182U6 drawn out from the end portion of inner circumferential end portion 181U6 radially outward of stator 130, a downwardly extending portion 183U6 connected to the end portion of radially extending portion 182U6 and extending downward to the end surface of yoke portion 152, a bottom portion 184U6 connected to the end portion of downwardly extending portion 183U6, and a rising portion 185U6 connected to the end portion of bottom portion 184U6 and rising in the direction of rotation centerline O.

Neutral point terminal portion 141U opens upward so as to receive W-phase wiring 134W5, and bottom portion 184U6 extends between the yoke portion of the divided stator core and W-phase wiring 134W5.

Though coil wire 230U6 has been described with reference to FIG. 6, other coil wires 230V6 and 230W6 are also similarly structured.

Figure 7:
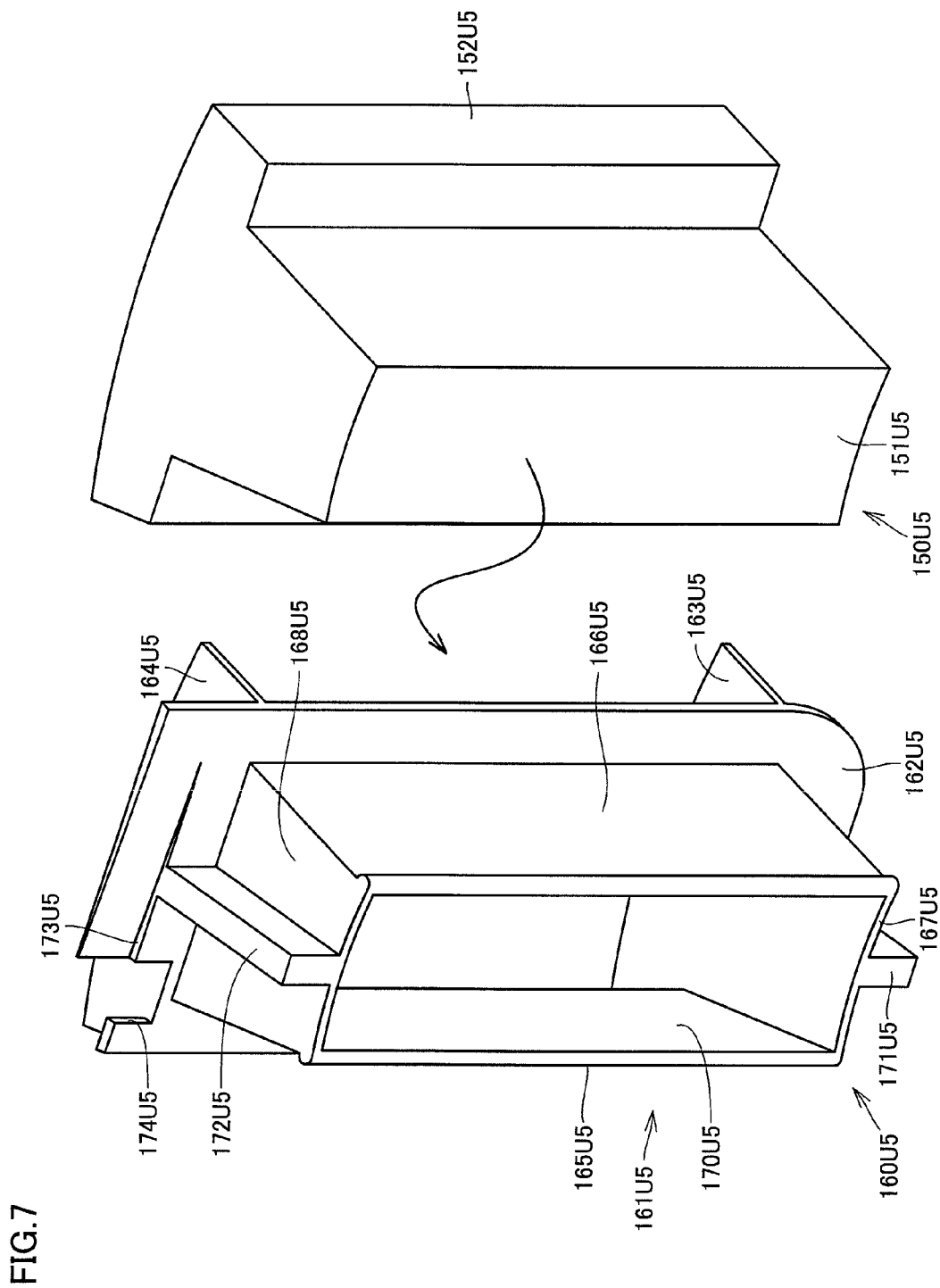
FIG. 7 is a perspective view of the divided stator core to which a U-phase coil of the coil wire shown in FIG. 5 is attached and an insulator attached to this divided stator core.

In addition, FIG. 7 is a perspective view of divided stator core 150U5 to which U-phase coil 131U5 of coil wire 230U5 shown in FIG. 5 is attached and an insulator 160U5 attached to divided stator core 150U5. Divided stator core 150U5 includes yoke portion 152U5 extending in the circumferential direction of stator 130 and stator teeth 151U5 projecting from yoke portion 152U5 toward rotor 120.

Insulator 160U5 made of an insulating member is attached to divided stator core 150U5, so that divided stator core 150U5 and coil wire 230U5 are insulated from each other. Insulator 160U5 includes a teeth reception portion 161U5 having a through hole 170U5 capable of receiving stator teeth 151U5 formed and a projection portion 162U5 extending from teeth reception portion 161U5 along the inner surface of yoke portion 152U5.

In addition, insulator 160U5 includes yoke insulating portions 163U5, 164U5 projecting radially outward from a circumferential surface on the radially outward side of projection portion 162U5 and covering the end surfaces of yoke portion 152U5 aligned in the direction of rotation centerline O.

In FIGS. 4 and 7, teeth reception portion 161U5 includes sidewall portions 165U5, 166U5 supporting respective side surfaces of stator teeth 151U5 and an upper wall portion 168U5 and a lower wall portion 167U5 supporting an upper end surface and a lower end surface of stator teeth 151U5 respectively. A protruding portion 172U5 protruding upward and supporting the inner circumferential surface of U-phase coil 131U5 is formed at an upper end portion of upper wall portion 168U5, and a protruding portion 171U5 protruding downward and supporting the inner circumferential surface of U-phase coil 131U5 is also formed on lower wall portion 167U5.

Projection portion 162U5 supports the end surface on the radially outward side of U-phase coil 131U5 attached to stator teeth 151U5 and insulates yoke portion 152U5 and U-phase coil 131U5 from each other. Projection portion 162U5 includes a wiring introduction portion 173U5 guiding U-phase wiring 134U5 from U-phase coil 131U5 attached to teeth reception portion 161 toward the yoke portion 152U5 side and supporting U-phase wiring 134U5. U-phase wiring 134U5 is drawn out from a wiring introduction port 174U5 formed in projection portion 162U5 over yoke insulating portion 164U5.

Here, yoke insulating portion 164U5 ensures insulation of U-phase wiring 134U5, U-phase terminal portion 135U5, V-phase wiring 134V5, and W-phase wiring 134W4 disposed over yoke insulating portion 164U5 from divided stator core 150U5.

Figure 8:
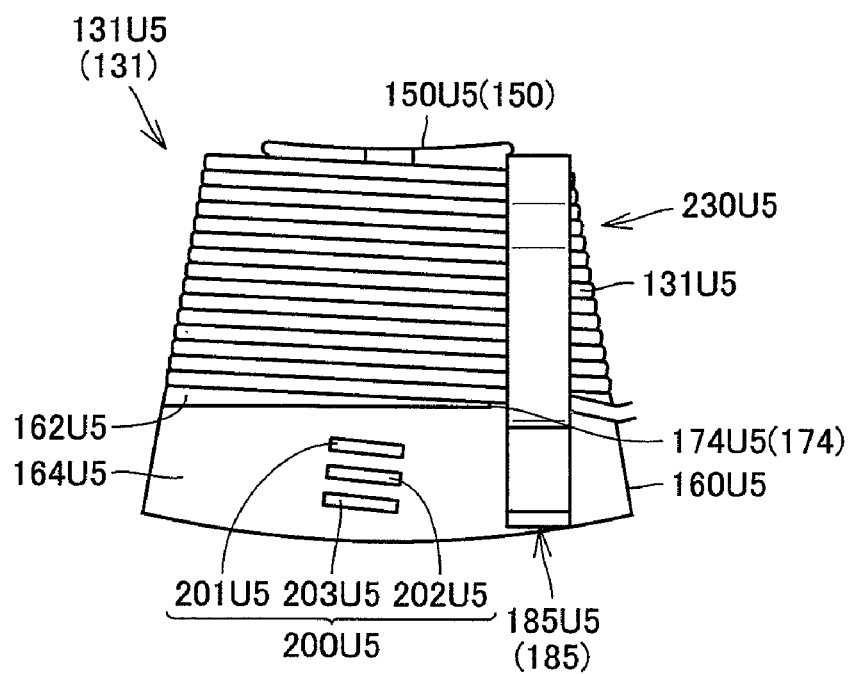
FIG. 8 is a plan view of the divided stator core.
Figure 9:
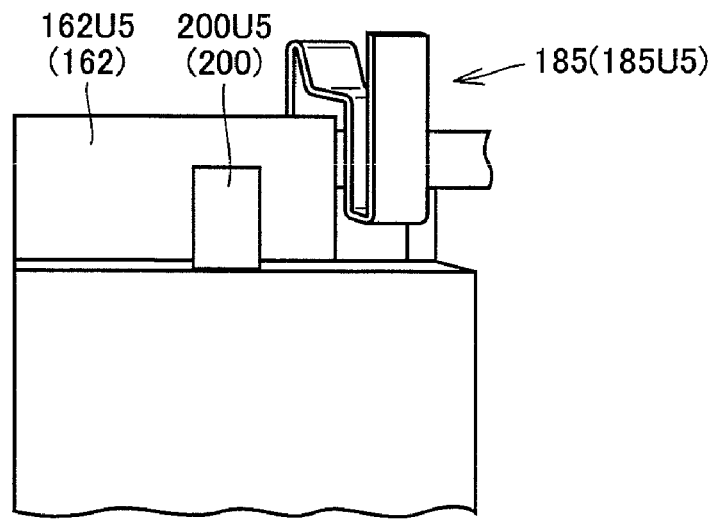
FIG. 9 is a rear view from a radially outward side.

FIG. 8 is a plan view of divided stator core 150U5, and FIG. 9 is a rear view of divided stator core 150U5 from the radially outward side. As shown in FIG. 8, a fixing member 200U5 is formed on yoke insulating portion 164U5 of insulator 160U5. Fixing member 200U5 includes a fixing portion 201U5, a fixing portion 202U5 formed at a distance from fixing portion 201U5 on the radially outward side, and a fixing portion 203U5 formed at a distance from fixing portion 202U5 on the radially outward side.

Figure 10:
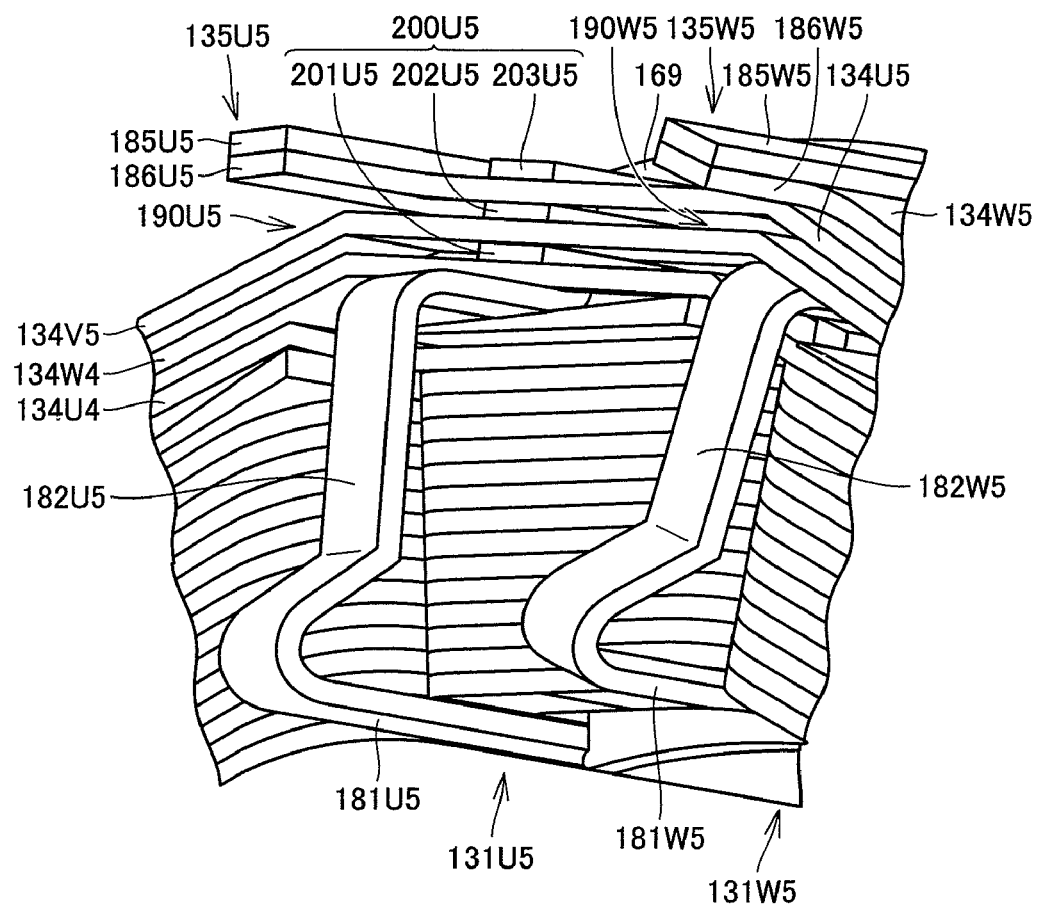
FIG. 10 is a plan view of the U-phase coil and a portion in the vicinity thereof.

FIG. 10 is a plan view of U-phase coil 131U5 and a portion in the vicinity thereof. As shown in FIG. 10, U-phase wiring 134U5 and V-phase wiring 134V5 pass through W-phase terminal portion 135W and W-phase wiring 134W4 is drawn out from W-phase coil 131W5.

W-phase wiring 134W4 is supported by fixing portion 201U5, and V-phase wiring 134V5 is supported by fixing portion 201U5 and fixing portion 202U5. In addition, U-phase wiring 134U5 is supported by fixing portion 202U5 and fixing portion 203U5. Thus, U-phase wiring 134U5, V-phase wiring 134V5 and W-phase wiring 134W4 are fixed by fixing member 200U5 and displaced.

In rotating electric machine 100 structured as such, U-phase external terminal portion 136U shown in FIG. 3 is supplied with U-phase AC power and U-phase coils 131U1 to 131U6 are supplied with U-phase AC power. In addition, V-phase external terminal portion 136V is supplied with V-phase AC power and V-phase coils 131V1 to 131V6 are supplied with U-phase AC power. Moreover, W-phase external terminal portion 136W is supplied with W-phase AC power and W-phase coils 131W1 to 131W6 are supplied with W-phase AC power. As AC power different in phase is thus supplied to each coil, rotor 120 shown in FIG. 1 rotates.

Figure 11:
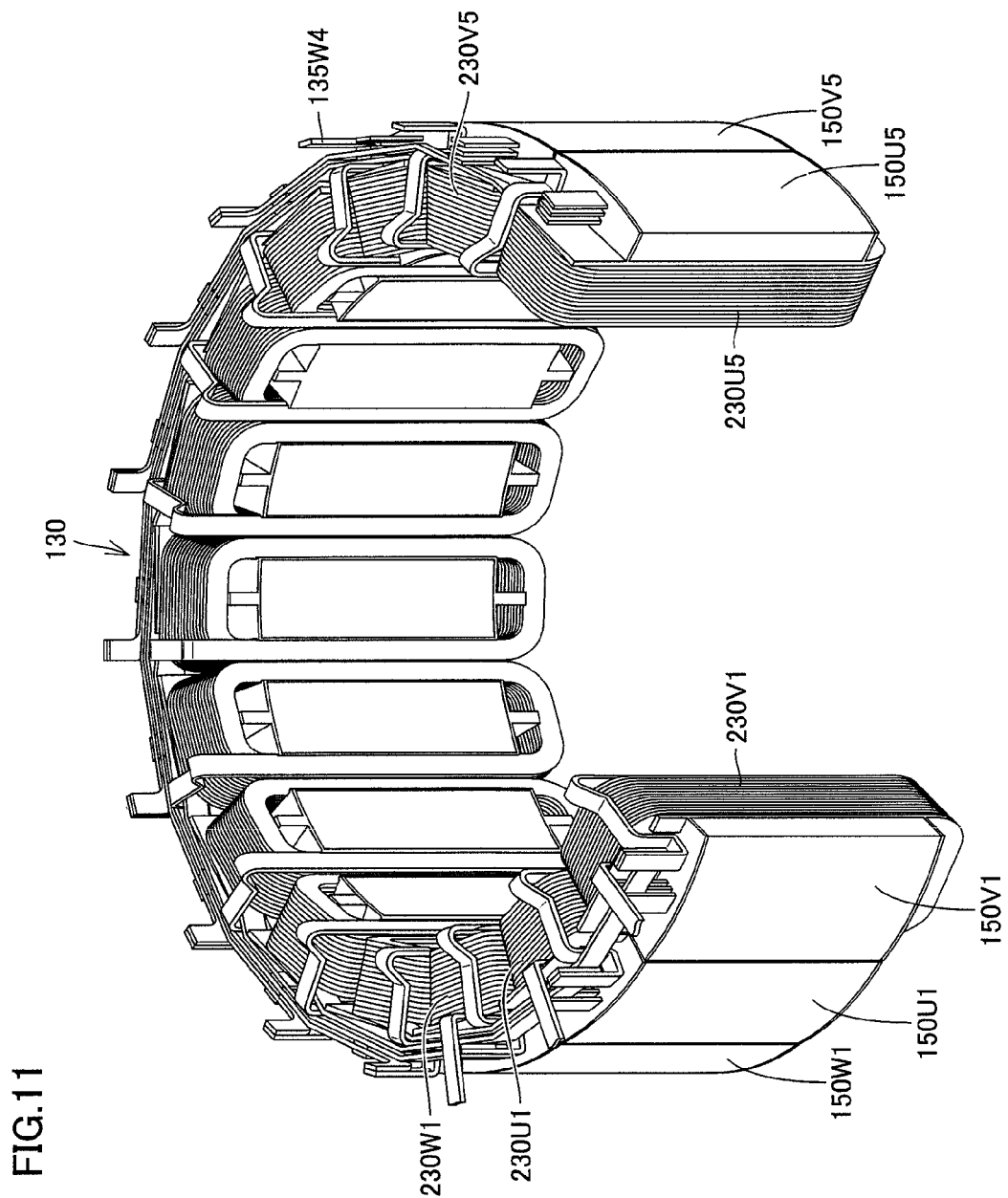
FIG. 11 is a perspective view showing a state in a process of manufacturing the rotating electric machine.

A method of manufacturing rotating electric machine 100 according to the present embodiment will be described with reference to FIGS. 11 and 12 as well as to any of FIGS. 1 to 10 as appropriate. FIG. 11 is a perspective view showing a state in a process of manufacturing rotating electric machine 100, and FIG. 12 is a perspective view showing a step following the state shown in FIG. 11.

Figure 12:
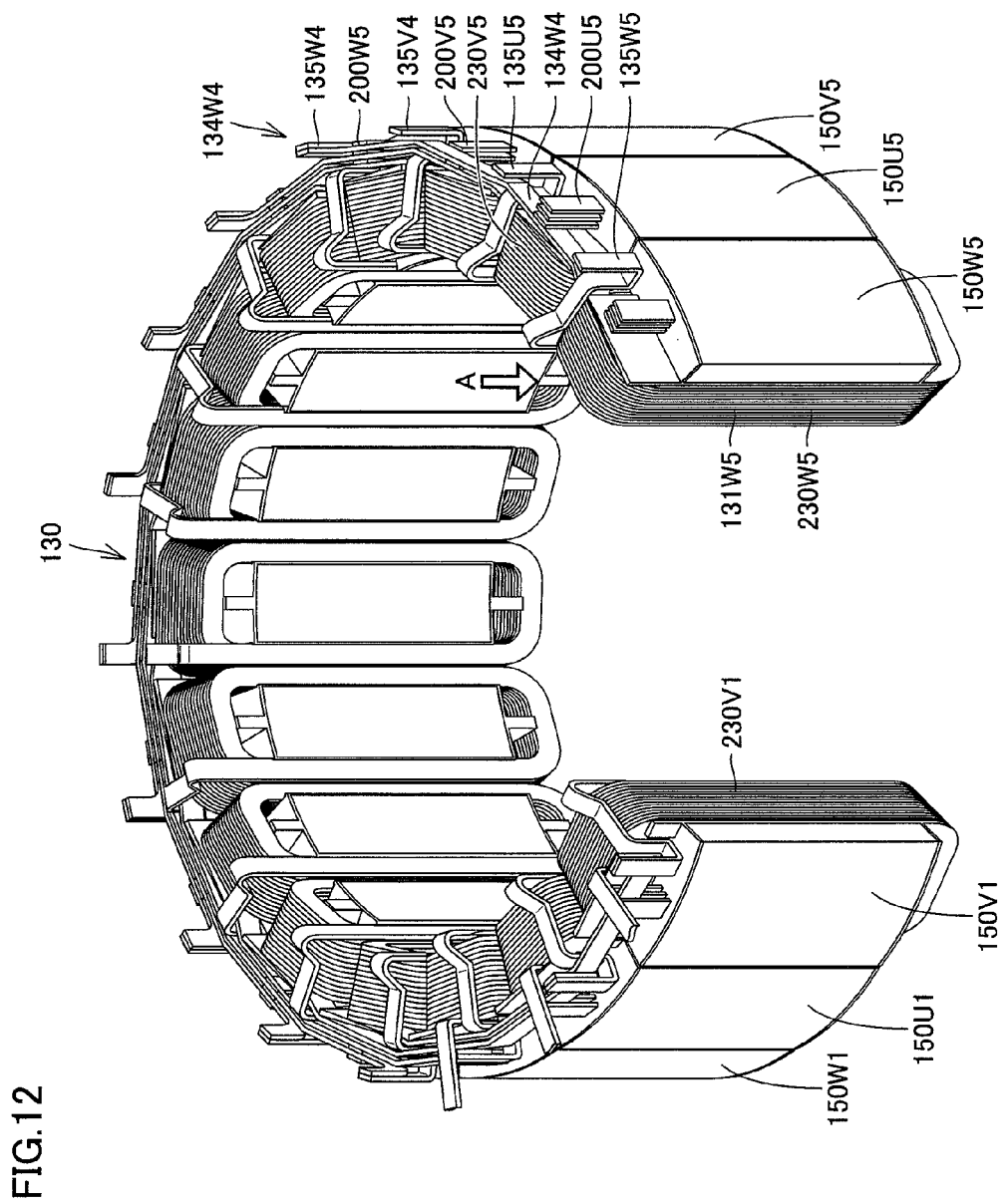
FIG. 12 is a perspective view showing a step following the state shown in FIG. 11.

As shown in FIGS. 11 and 12, rotating electric machine 100 forms annular stator 130 such that divided stator cores 150 to which coils are attached are successively fitted from above in a direction opposite to the direction of extension of U-phase wiring 134U, V-phase wiring 134V, and W-phase wiring 134W (in the present embodiment, a clockwise direction).

For example, in FIG. 11, divided stator cores 150V1, 150U1, 150W1 to 150V5, 150U5 around which coil wires 230V1, 230U1, 230W1 to 230V5, 230U5 are wound respectively are assembled along the circumferential direction of stator 130.

FIG. 12 shows such a state that divided stator core 150W5 into which coil wire 230W5 has been assembled is newly assembled from the state shown in FIG. 11.

As shown in FIG. 12, divided stator core 150W5 is assembled from a direction shown with an arrow A of rotating electric machine 100.

W-phase wiring 134W4 is drawn out from W-phase coil 131W5 and fixed by fixing member 200U5, fixing member 200V5 and fixing member 200W5, and it passes through a recess defined by U-phase terminal portion 135U5 and V-phase terminal portion 135V4. The tip end portion of W-phase wiring 134W4 is connected to the inner circumferential surface of W-phase terminal portion 135W4.

Here, in FIG. 8, fixing portion 201U5, fixing portion 202U5 and fixing portion 203U5 constituting fixing member 200U5 are formed at a distance from each other as described above, and W-phase wiring 134W4 can be fitted into the side surface side of fixing portion 201U5 from above.

Other fixing member 200V5 and fixing member 200W5 are also constituted similarly to fixing member 200U5, and W-phase wiring 134W4 can readily be fixed by fitting divided stator core 150W5 in the direction of arrow A.

Moreover, the recess defined by U-phase terminal portion 135U5 and V-phase terminal portion 135V4 opens so as to be able to receive W-phase wiring 134W4 introduced from the direction of arrow A. Even when divided stator core 150W5 is inserted from the direction of arrow A, interference of W-phase wiring 134W4, U-phase terminal portion 135U5, and V-phase terminal portion 135V4 with one another is suppressed.

By positioning W-phase wiring 134W5 with fixing member 200U5, fixing member 200V5 and fixing member 200W5, the inner circumferential surface of W-phase terminal portion 135W5 and the tip end portion of W-phase wiring 134W4 can accurately be brought in contact with each other and connection between W-phase wiring 134W4 and W-phase terminal portion 135W4 can readily be achieved.

By thus successively attaching divided stator cores 150V1, 150U1, 150W1 to 150V8, 150U8, 150W8, stator 130 can readily be formed. Thereafter, by fixing stator 130 in a motor case and arranging rotor 120 on the inner circumferential side of stator 130, rotating electric machine 100 can be manufactured.

In the examples shown in FIGS. 11 and 12 above, divided stator core 150 is newly inserted from the direction of arrow A in the direction opposite to the direction of extension of each wiring so as to form rotating electric machine 100, however, the example is not limited as such.

Figure 13:
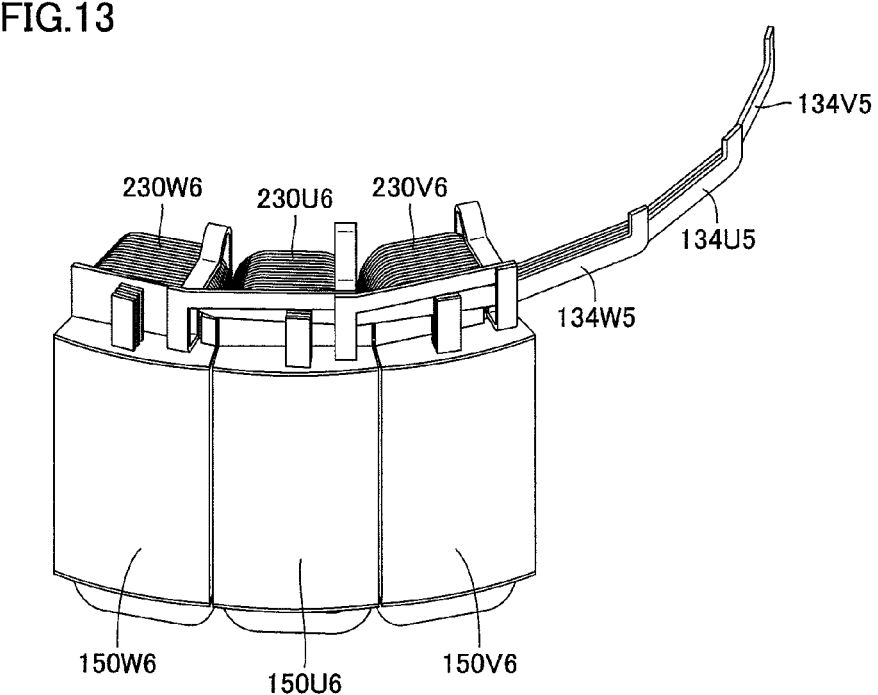
FIG. 13 is a perspective view showing a state in a process of manufacturing the rotating electric machine.
Figure 14:
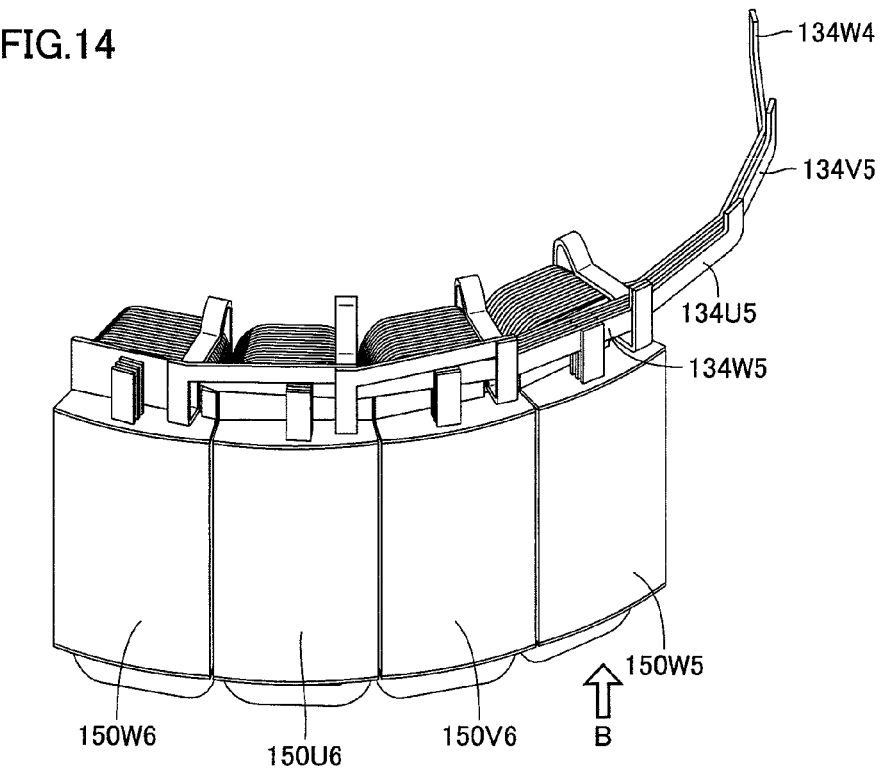
FIG. 14 is a perspective view showing a step following the state shown in FIG. 13.

FIG. 13 is a perspective view showing a state in a process of manufacturing rotating electric machine 100, and FIG. 14 is a perspective view showing a step following the state shown in FIG. 13.

In the state shown in FIG. 13, divided stator cores 150V1, 150U1, 150W1 to which coil wires 230V6, 230U6, 230W6 are attached respectively are aligned. As shown in FIG. 14, divided stator core 150W5 may be inserted in a direction of an arrow B and attached in a forward direction of extension of wirings 134V5, 134U5, 134W5.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

INDUSTRIAL APPLICABILITY

The present invention relates to a rotating electric machine, and it is particularly suitable for a rotating electric machine including a plurality of divided stator cores.

The invention claimed is:

1. A rotating electric machine, comprising:
a rotatably provided rotor; and
an annular stator including an annularly formed stator core arranged around said rotor and a winding portion formed by winding a part of a coil wire around said stator core, said stator core including a plurality of divided stator cores aligned in a circumferential direction of said stator, said divided stator core including a yoke portion extending in the circumferential direction of said stator and stator teeth projecting from the yoke portion toward said rotor, to which said winding portion is attached, and
said coil wire including said winding portion wound around said stator teeth, a drawn-out portion drawn out from one end portion of said winding portion over said yoke portion, and a wiring portion drawn out from the other end portion of said winding portion to extend over said yoke portion and connected to a drawn-out portion of another coil wire including another winding portion provided at a distance from said winding portion in the circumferential direction of said stator,
wherein:
said coil wire includes a first coil wire supplied with AC power of a first phase and a second coil wire connected to the first coil wire and a third coil wire supplied with AC power of a second phase and a fourth coil wire connected to the third coil wire,
a third winding portion of said third coil wire is provided at a position adjacent to a first winding portion of said first coil wire in the circumferential direction of said stator,
a second winding portion of said second coil wire is arranged opposite to said first winding portion, with respect to the third winding portion of said third coil wire,
a fourth winding portion of said fourth coil wire is arranged opposite to said third winding portion, with respect to said second winding portion,
a first wiring portion of said first coil wire is connected to a second drawn-out portion of said second coil wire through an outer circumferential side of said third winding portion,
a third wiring portion of said third coil wire is connected to a fourth drawn-out portion of said fourth coil wire through an outer circumferential side of said second winding portion,
a third drawn-out portion of said third coil wire extends radially outward of said stator between said first wiring portion and said yoke portion and bends in a direction of a central axis of said stator for receiving said first wiring portion on a side radially outward of said stator relative to said first wiring portion, and
the second drawn-out portion of said second coil wire extends radially outward of said stator between said third wiring portion and said yoke portion and bends toward the direction of the central axis of said stator for receiving said third wiring portion on a side radially outward of said stator relative to said third wiring portion.

2. The rotating electric machine according to claim 1, wherein said wiring portion is drawn out from an end portion of said winding portion on a radially outward side of said stator over said yoke portion, and said drawn-out portion is drawn out from an end portion of said winding portion on a radially inward side of said stator over said yoke portion.

3. The rotating electric machine according to claim 1, further comprising an insulating member attached to said stator teeth, for insulating said coil wire and said stator teeth from each other,
wherein said insulating member includes a stator teeth reception portion having a through hole capable of receiving said stator teeth formed and a projection portion formed to project from the stator teeth reception portion and extending along an inner circumferential surface of said yoke portion, and
said projection portion has a guide portion formed, for guiding said wiring portion from said winding portion to said yoke portion.

4. The rotating electric machine according to claim 3, wherein said insulating member includes a yoke insulating portion for insulating said wiring portion and said drawn-out portion from said yoke portion.

5. The rotating electric machine according to claim 1, wherein:

said coil wire has a cross-section in a square shape perpendicular to a direction of extension of the coil wire, and said winding portion is structured by winding and layering the coil wire from a base portion of said stator teeth located on a side of said yoke portion toward a tip end portion thereof located radially inward of said stator.

* * * * *